US010647271B2

United States Patent
Toyoshima et al.

(10) Patent No.: US 10,647,271 B2
(45) Date of Patent: May 12, 2020

(54) WIRE HARNESS

(71) Applicant: Hitachi Metals, Ltd., Tokyo (JP)

(72) Inventors: Naoya Toyoshima, Tokyo (JP); Hajime Maejo, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/391,442

(22) Filed: Apr. 23, 2019

(65) Prior Publication Data

US 2019/0344732 A1    Nov. 14, 2019

(30) Foreign Application Priority Data

May 10, 2018 (JP) ................................ 2018-091211

(51) Int. Cl.
| | | |
|---|---|---|
| B60R 16/02 | (2006.01) | |
| H01R 13/52 | (2006.01) | |
| H02G 3/32 | (2006.01) | |
| H01B 7/282 | (2006.01) | |
| H01B 7/00 | (2006.01) | |
| H02G 3/22 | (2006.01) | |
| H02G 3/04 | (2006.01) | |

(52) U.S. Cl.
CPC ....... *B60R 16/0215* (2013.01); *H01B 7/0045* (2013.01); *H01B 7/2825* (2013.01); *H01R 13/5205* (2013.01); *H01R 13/5213* (2013.01); *H02G 3/0406* (2013.01); *H02G 3/22* (2013.01); *H02G 3/32* (2013.01)

(58) Field of Classification Search
CPC .............. B60R 16/0215; H01B 7/0045; H01R 13/5205; H02G 3/22

USPC ....................................................... 174/72 A
See application file for complete search history.

(56) References Cited

U.S. PATENT DOCUMENTS

| | | | |
|---|---|---|---|
| 3,617,614 A | * | 11/1971 | Henry .................. H01B 17/306 |
| | | | 174/77 R |
| 4,288,107 A | | 9/1981 | Schwartze |
| 4,625,073 A | | 11/1986 | Breesch et al. |
| | | (Continued) | |

FOREIGN PATENT DOCUMENTS

JP         2016-162584 A        9/2016

OTHER PUBLICATIONS

United States Notice of Allowance dated Aug. 21, 2019 in U.S. Appl. No. 16/392,308.

(Continued)

*Primary Examiner* — Sherman Ng
(74) *Attorney, Agent, or Firm* — McGinn I.P. Law Group, PLLC

(57) ABSTRACT

A wire harness includes a cable that includes electric wires and a sheath covering the electric wires and is arranged so that the electric wires are exposed from an end of the sheath, a housing that accommodates the electric wires exposed from the end of the sheath, a sealing member arranged inside the housing, and a cylindrical holder including an elastic body and having an inner circumferential surface in contact with an outer circumferential surface of the sheath. An engaging portion provided on one of the housing and the holder engages an engaged portion provided on an other of the housing and the holder. The engagement between the engaging portion and the engaged portion restricts the housing from moving in a longitudinal direction of the cable.

20 Claims, 8 Drawing Sheets

(56) References Cited

U.S. PATENT DOCUMENTS

| | | | |
|---|---|---|---|
| 4,723,054 A | 2/1988 | Billet | |
| 6,466,725 B2 | 10/2002 | Battey et al. | |
| 6,494,731 B1* | 12/2002 | Suzuki | H01R 13/5208 |
| | | | 439/275 |
| 7,635,813 B2 | 12/2009 | Taylor et al. | |
| 9,059,534 B2 | 6/2015 | Endo et al. | |
| 9,252,577 B1 | 2/2016 | Smith | |
| 10,003,141 B2 | 6/2018 | Komori et al. | |
| 2007/0187144 A1 | 8/2007 | Kato | |
| 2012/0298417 A1* | 11/2012 | Kempeneers | G02B 6/4465 |
| | | | 174/77 R |
| 2013/0092433 A1 | 4/2013 | Hoshiyama | |
| 2014/0011401 A1 | 1/2014 | Endo et al. | |
| 2015/0270628 A1* | 9/2015 | Kalass | H01R 4/72 |
| | | | 307/10.1 |
| 2015/0318679 A1 | 11/2015 | Nakai et al. | |
| 2015/0355213 A1* | 12/2015 | Kobayashi | G01P 1/026 |
| | | | 324/207.25 |
| 2016/0339854 A1 | 11/2016 | Hayakawa et al. | |
| 2017/0313265 A1 | 11/2017 | Shimizu et al. | |
| 2018/0019041 A1 | 1/2018 | Takahashi et al. | |
| 2018/0048081 A1* | 2/2018 | Komori | H01R 4/70 |
| 2018/0138676 A1 | 5/2018 | Yabashi | |
| 2019/0296538 A1 | 9/2019 | Andre | |

OTHER PUBLICATIONS

United States Office Action dated Dec. 11, 2019 in U.S. Appl. No. 16/392,320.

\* cited by examiner

WIRE HARNESS

CROSS-REFERENCE TO RELATED APPLICATIONS

The present application is based on Japanese patent application No. 2018-091211 filed on May 10, 2018, the entire contents of which are incorporated herein by reference.

BACKGROUND OF THE INVENTION

1. Field of the Invention

The invention relates to a wire harness used in, e.g., a vehicle and routed in a region which can get covered with liquid such as water splash.

2. Description of the Related Art

JP 2016/162584 discloses a wire harness which is used in, e.g., a vehicle for power supply to electric parking brake and signal transmission.

The wire harness disclosed in JP 2016/162584 has a structure in which plural electric wires are branched and extend out of an end portion of a sheath, and a synthetic resin housing is attached to cover the area around the end portion of the sheath. A rubber plug for sheath and rubber plugs for electric wire, which have a cylindrical shape, are arranged inside the housing and prevent water from entering through a gap between the sheath and the electric wires. In addition, a synthetic resin cap is attached to the housing and prevents the rubber plugs for electric wire from slipping out.

The rubber plug for sheath is arranged at an end portion of the housing on the opposite side to the cap, and has plural inner lips in elastic contact with the outer circumferential surface of the sheath, plural outer lips in elastic contact with the inner surface of the housing, and an annular flange facing an end face of the housing. The flange functions as a stopper for the rubber plug for sheath when the rubber plug for sheath is pushed into the housing.

SUMMARY OF THE INVENTION

The electric wires or sheath of a vehicle wire harness may be subjected to vertical vibration while driving the vehicle. The wire harness disclosed in JP 2016/162584 may be subjected to a reduction in water tightness by that, e.g., when the housing is vibrated hard, the housing is separated or offset from the sheath.

It is an object of the invention to provide a wire harness that allows the water tightness thereof to be maintained even when being vibrated.

According to an embodiment of the invention, a wire harness comprises:
 a cable that comprises electric wires and a sheath covering the electric wires and is arranged so that the electric wires are exposed from an end of the sheath;
 a housing that accommodates the electric wires exposed from the end of the sheath;
 a sealing member arranged inside the housing; and
 a cylindrical holder comprising an elastic body and having an inner circumferential surface in contact with an outer circumferential surface of the sheath,
 wherein an engaging portion provided on one of the housing and the holder engages an engaged portion provided on an other of the housing and the holder, and wherein the engagement between the engaging portion and the engaged portion restricts the housing from moving in a longitudinal direction of the cable.

Effects of the Invention

According to an embodiment of the invention, a wire harness can be provided that allows the water tightness thereof to be maintained even when being vibrated.

DETAILED DESCRIPTION OF THE EMBODIMENTS

First Embodiment

Figure 1:
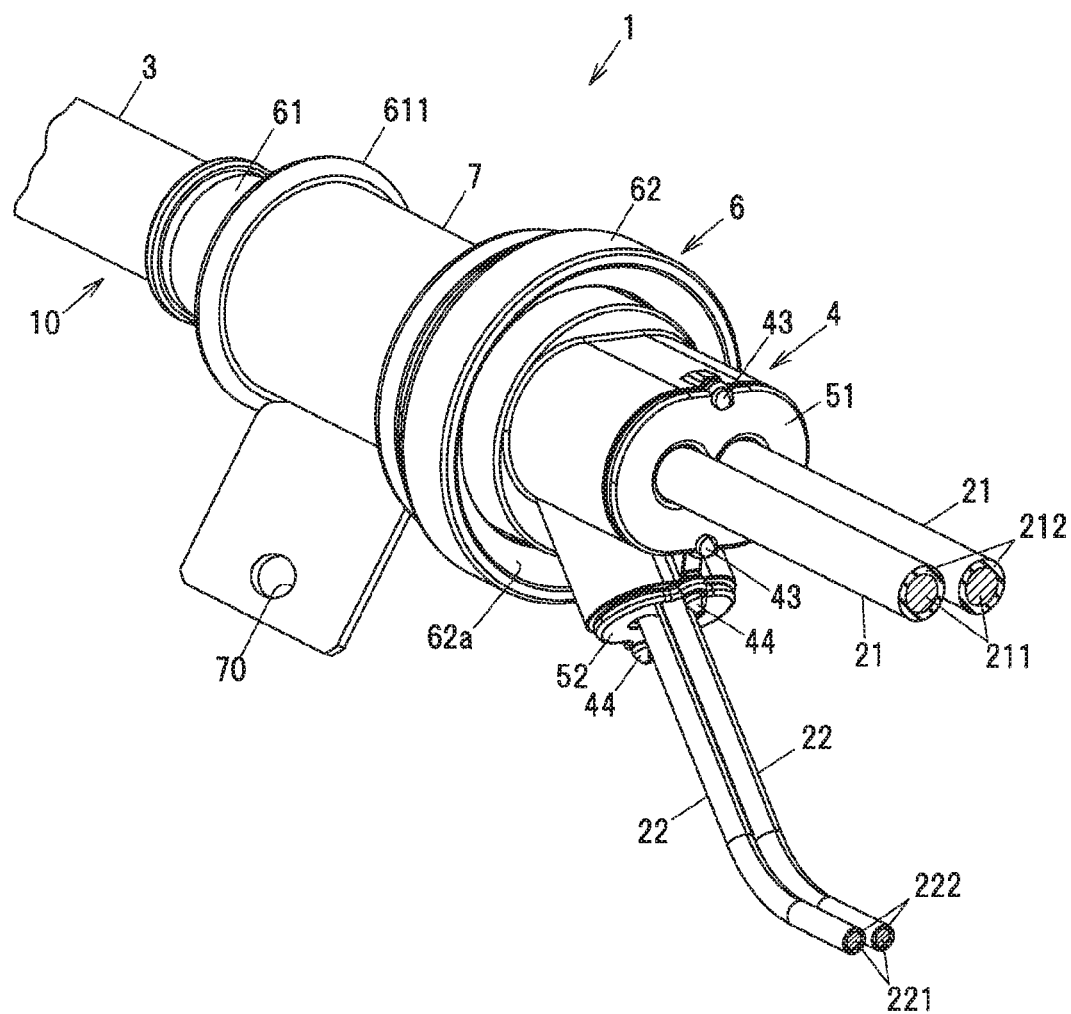
FIG. 1 is a perspective view showing a wire harness in the first embodiment of the present invention.
Figure 2:
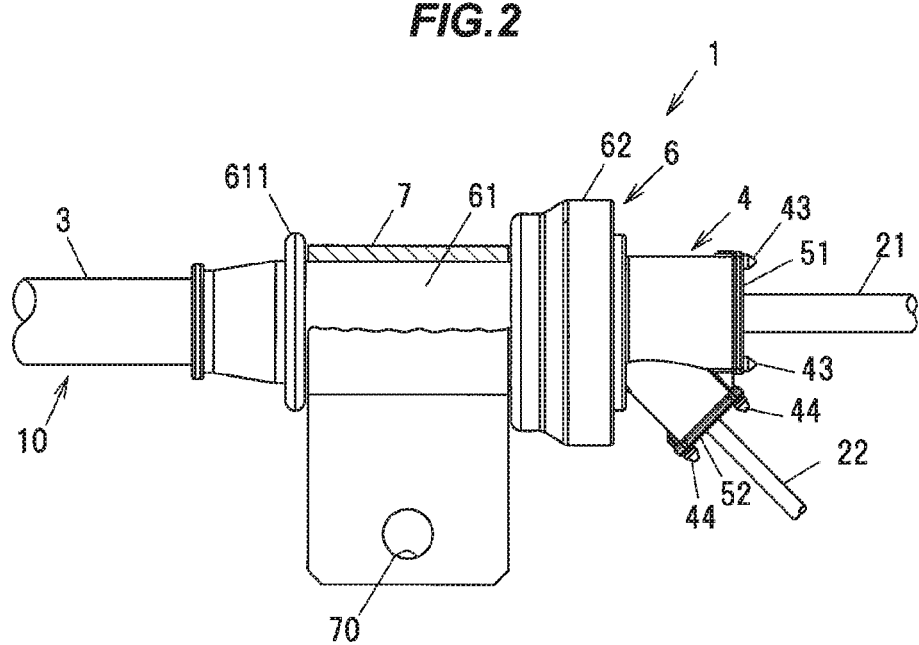
FIG. 2 is a side view showing the wire harness in which a fixing member is partially cutaway.
Figure 3A:
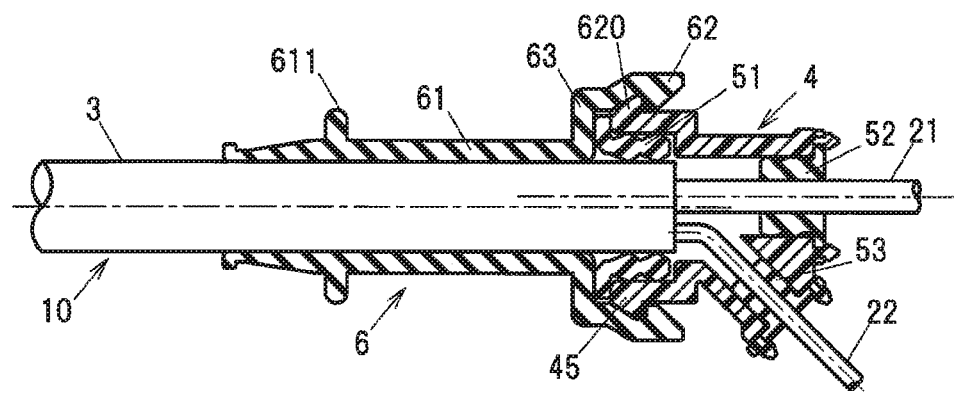
FIG. 3A is a cross sectional view showing the wire harness.
Figure 3B:
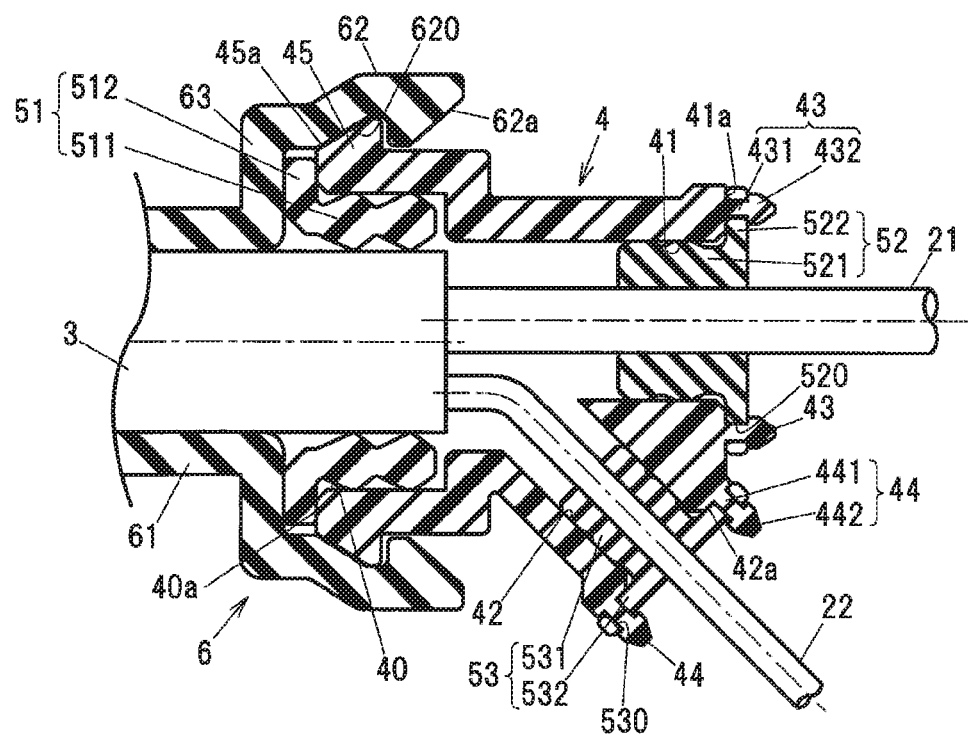
FIG. 3B is an enlarged view showing the main portion of FIG. 3A.
Figure 4:
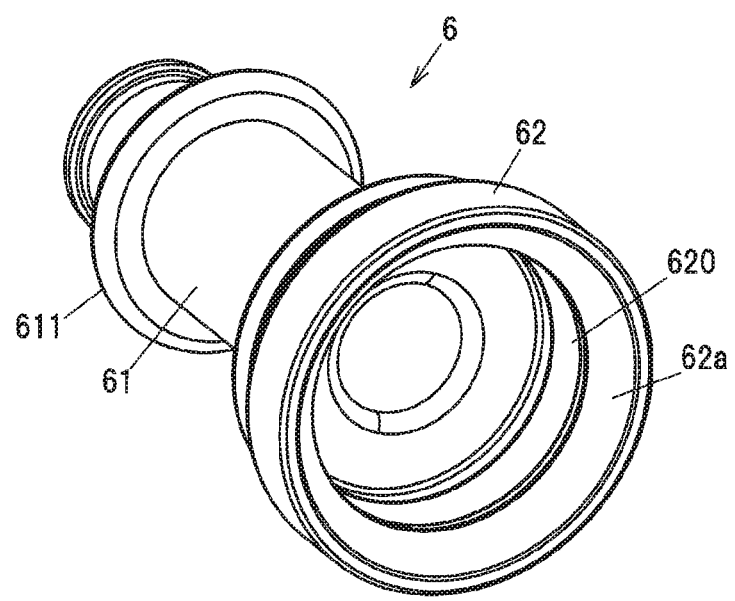
FIG. 4 is a perspective view showing a holder of the wire harness.
Figure 5:
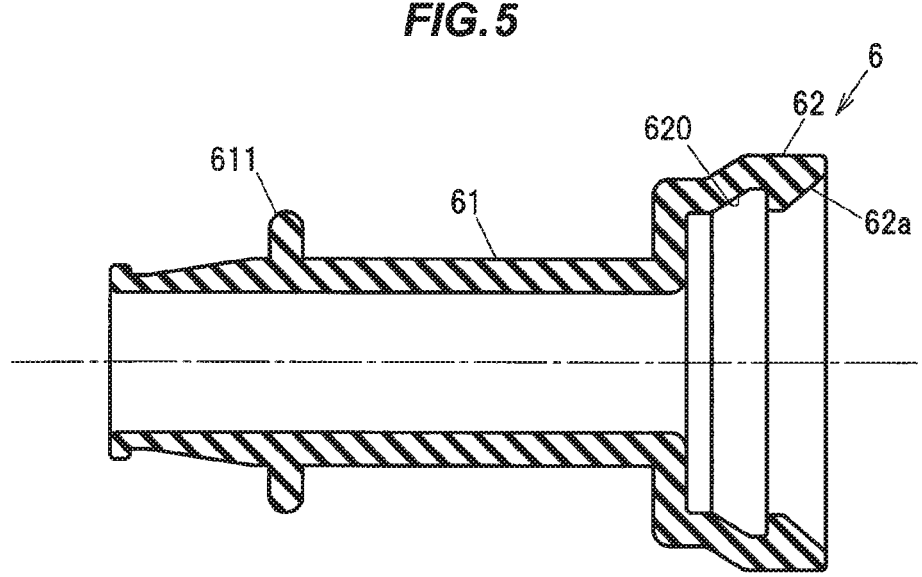
FIG. 5 is a cross sectional view showing the holder.
Figure 6:
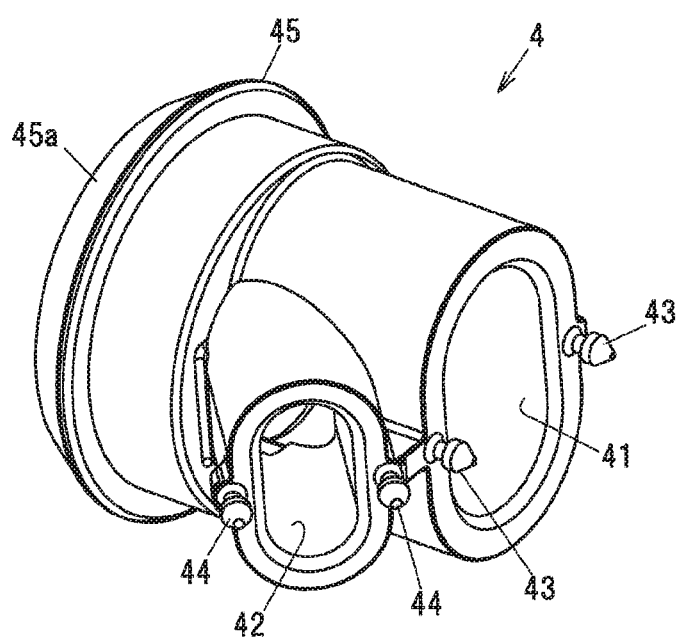
FIG. 6 is a perspective view showing a housing.
Figure 7:
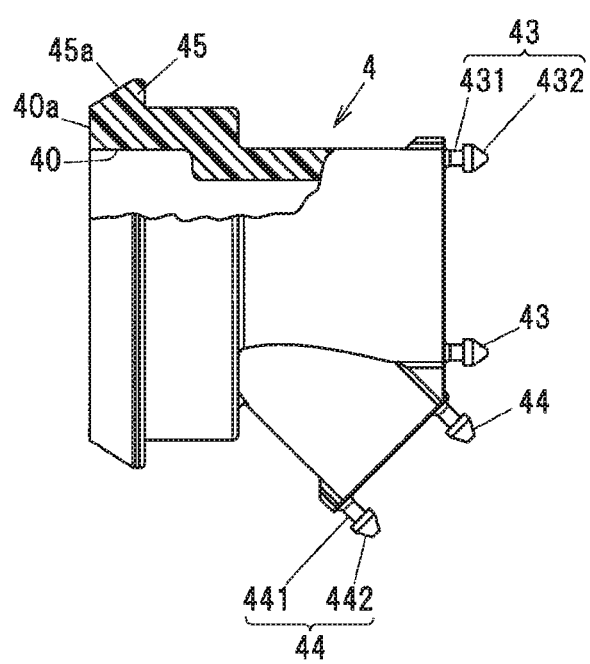
FIG. 7 is a side view showing the housing which is partially cutaway and shown as a cross section.

FIG. 1 is a perspective view showing a wire harness in the first embodiment of the invention. FIG. 2 is a side view showing the wire harness in which a fixing member is partially cutaway. FIG. 3A is a cross sectional view showing the wire harness and FIG. 3B is an enlarged view showing the main portion of FIG. 3A. FIG. 4 is a perspective view showing a holder of the wire harness. FIG. 5 is a cross sectional view showing the holder. FIG. 6 is a perspective view showing a housing. FIG. 7 is a side view showing the housing which is partially cutaway and shown as a cross section.

A wire harness 1 is used for electric parking brake device or electric brake device in automobile. In more detail, the wire harness 1 is used in an automobile to supply an operating current to activate an electric parking brake device provided on each wheel and to transmit a signal of a rotational speed sensor used for measuring the speed of a wheel rotation (a signal used in, e.g., anti-lock braking system (ABS)).

The wire harness 1 is provided with a cable 10 which has a pair of power lines 21 for supplying an operating current to the electric parking brake device, a pair of signal lines 22 for transmitting a signal from the rotational speed sensor, and a sheath 3 covering the pair of power lines 21 and the pair of signal lines 22. The wire harness 1 is also provided with a housing 4 accommodating the pair of power lines 21 and the pair of signal lines 22 which are exposed and extend from an end portion of the sheath 3, first to third sealing members 51 to 53 arranged inside the housing 4, a cylindrical holder 6 formed of an elastic body, and a fixing member 7 for fixing the cable 10 to a fixing target (e.g., an automobile body). That is, the wire harness 1 in the first embodiment is a wire harness equipped with a fixing member. In the first embodiment, the housing 4 also accommodates the end portion of the sheath 3 from which the pair of power lines 21 and the pair of signal lines 22 extend out.

Each of the pair of power lines 21 is an insulated wire in which a metal conductor 211 formed by twisting plural metal strands is covered with an insulation 212. An electric current output from a controller (not shown) is supplied to the electric parking brake device through the pair of power lines 21. Meanwhile, each of the pair of signal lines 22 is an insulated wire in which a metal conductor 221 formed by twisting plural metal strands is covered with an insulation 222. A signal output from the rotational speed sensor is transmitted to the controller (not shown) through the pair of signal lines 22. The power line 21 is thicker than the signal line 22. The metal conductor 211 of the power line 21 is also thicker than the metal conductor 221 of the signal line 22. The pair of power lines 21 and the pair of signal lines 22 are one aspect of the plurality of electric wires of the invention.

The pair of power lines 21 and the pair of signal lines 22 are covered with the single sheath 3 in a longitudinal portion of the cable 10, and are exposed from an end portion of the sheath 3. The sheath 3 is pliable (flexible) enough to flexibly bend when routing the wire harness 1 in an automobile body, and the sheath 3 in the first embodiment is formed of a thermoplastic urethane. The outer cross-sectional shape of the sheath 3 (the cross section orthogonal to the longitudinal direction of the cable 10) is a circle.

The housing 4 is formed of, e.g., a synthetic resin but may be formed of, e.g., a metal such as aluminum alloy. The housing 4 has an inlet hole 40 into which the sheath 3 accommodating the pair of power lines 21 and the pair of signal lines 22 is inserted, a first outlet hole 41 for the pair of power lines 21 to extend out, and a second outlet hole 42 for the pair of signal lines 22 to extend out.

The housing 4 is configured that a direction of the electric wires extending from the first outlet hole 41 is different from a direction of the electric wires extending from the second outlet hole 42. In the first embodiment, the extending direction of the pair of power lines 21 is parallel to the insertion direction of the sheath 3, and the extending direction of the pair of signal lines 22 is inclined (intersects) with respect to the extending direction of the pair of power lines 21. The pair of signal lines 22 are bent inside the housing 4 at an angle corresponding to the inclination. Due to the inclination of the electric wire extending direction, the pair of power lines 21 and the pair of signal lines 22 can be easily routed in a wheel-well of the automobile.

The first to third sealing members 51 to 53 are formed of a rubber and prevent liquid such as water from entering the inside of the housing 4. The first sealing member 51 is arranged in the inlet hole 40 so as to be interposed between the housing 4 and the sheath 3, and is in elastic contact with the inner surface of the housing 4 and with the outer circumferential surface of the sheath 3. The second sealing member 52 is arranged in the first outlet hole 41 so as to be interposed between the housing 4 and the pair of power lines 21, and is in elastic contact with the inner surface of the housing 4 and with the outer circumferential surfaces of the pair of power lines 21. The third sealing member 53 is arranged in the second outlet hole 42 so as to be interposed between the housing 4 and the pair of signal lines 22, and is in elastic contact with the inner surface of the housing 4 and with the outer circumferential surfaces of the pair of signal lines 22.

The first to third sealing members 51 to 53 prevent water, etc., from entering the inside of the housing 4 through a gap between the housing 4 and the sheath 3, a gap between the housing 4 and the pair of power lines 21, and a gap between the housing 4 and the pair of signal lines 22. The first sealing member 51 is one aspect of the sheath seal member of the invention, and the second and third sealing members 52 and 53 are one aspect of the wire seal members of the invention.

The housing 4 has plural locking protrusions 43 provided to lock the second sealing member 52. Each locking protrusion 43 has a shaft-shaped portion 431 and a locking portion 432 having a larger diameter than the shaft-shaped portion 431, and is configured that the shaft-shaped portion 431 rises upright from an opening end face 41a of the first outlet hole 41. The second sealing member 52 has a main body 521 arranged inside the first outlet hole 41 and a flange 522 facing the opening end face 41a of the first outlet hole 41. The shaft-shaped portion 431 is inserted through a through-hole 520 formed on the flange 522 and the locking portion 432 locks the second sealing member 52.

The housing 4 also has plural locking protrusions 44 provided to lock the third sealing member 53. Each locking protrusion 44 has a shaft-shaped portion 441 and a locking portion 442 having a larger diameter than the shaft-shaped portion 441, and is configured that the shaft-shaped portion 441 rises upright from an opening end face 42a of the second outlet hole 42. The third sealing member 53 has a main body 531 arranged inside the second outlet hole 42 and a flange 532 facing the opening end face 42a of the second outlet hole 42. The shaft-shaped portion 441 is inserted through a through-hole 530 formed on the flange 532 and the locking portion 442 locks the third sealing member 53.

The holder 6 is formed of an elastic body more flexible than the sheath 3, such as rubber, and has a cylindrical shape. The holder 6 in the first embodiment is formed of an ethylene propylene rubber. The holder 6 has a lower hardness than the sheath 3, such that the holder 6 has a Shore hardness A of, e.g., 60 and the sheath 3 has a Shore hardness A of, e.g., 80. Thus, damage such as cracks on the sheath 3 due to, e.g., friction with the holder 6 is prevented even when, e.g., the cable 10 is vibrated.

The holder 6 integrally has a small diameter cylindrical portion 61 having an inner circumferential surface in elastic contact with the outer circumferential surface of the sheath 3, a large diameter cylindrical portion 62 accommodating the housing 4 and having an inner circumferential surface in elastic contact with the outer circumferential surface of the housing 4, and a wall portion 63 between the small diameter cylindrical portion 61 and the large diameter cylindrical portion 62. The large diameter cylindrical portion 62 has larger inner and outer diameters than the small diameter cylindrical portion 61 and is arranged around an end portion of the housing 4 on the inlet hole 40 side. Meanwhile, the small diameter cylindrical portion 61 has an annular protruding wall 611 axially facing the wall portion 63 with a gap therebetween and is configured that the outer circumferential surface on the end side (the end opposite to the wall portion 63) relative to the protruding wall 611 is formed as a tapered surface and becomes gradually narrower toward the end. The outer diameter of the small diameter cylindrical portion 61 is uniform in the axial direction from the protruding wall 611 to the wall portion 63. The inner circumferential surface of the small diameter cylindrical portion 61 is circular in shape so as to match the outer shape of the sheath 3.

An engaging portion provided on one of the housing 4 and the holder 6 engages an engaged portion provided on the other of the housing 4 and the holder 6, and the housing 4 is thereby restricted from moving in the longitudinal direction of the cable 10. In the first embodiment, an annular engagement protrusion 45 as the engaging portion is formed on the outer surface of the housing 4 at the end on the inlet hole 40 side, while an annular engagement groove 620 as the engaged portion is formed on the inner surface of the large diameter cylindrical portion 62 of the holder 6 and engages the engagement protrusion 45.

When causing engagement between the engagement protrusion 45 of the housing 4 and the engagement groove 620, the large diameter cylindrical portion 62 of the holder 6 is elastically deformed to enlarge the diameter and an end portion of the housing 4 is pushed into the large diameter cylindrical portion 62 in the axial direction (in the longitudinal direction of the cable 10). The inner circumferential surface of the large diameter cylindrical portion 62 at the end potion on the opening side is formed as a tapered inner circumferential surface 62a of which inner diameter increases with an increase in an axial distance from the engagement groove 620. On the other hand, the outer circumferential surface of the engagement protrusion 45 of the housing 4 is formed as a tapered outer circumferential surface 45a which butts against the tapered inner circumferential surface 62a of the holder 6. When causing engagement between the engagement protrusion 45 of the housing 4 and the engagement groove 620, the tapered outer circumferential surface 45a butts against the tapered inner circumferential surface 62a and the large diameter cylindrical portion 62 is thereby enlarged in diameter.

The diameter of the inner circumferential surface of the small diameter cylindrical portion 61 in the natural state before attachment to the sheath 3 is smaller than the outer diameter of the sheath 3. The small diameter cylindrical portion 61 is fitted around the sheath 3 while using air, etc., to enlarge the diameter of the small diameter cylindrical portion 61. After fitting, the enlarged diameter of the small diameter cylindrical portion 61 is reduced and the small diameter cylindrical portion 61 elastically comes into contact with the outer circumferential surface of the sheath 3. Thus, a tightening force of the small diameter cylindrical portion 61 acts on the sheath 3. Due to the tightening force, the holder 6 is restricted from moving in the longitudinal direction of the cable 10. Thus, the housing 4 (the engagement protrusion 45), which engages the holder 6 (the large diameter cylindrical portion 62) restricted from moving in the longitudinal direction of the cable 10, is also restricted from moving in the longitudinal direction of the cable 10. In addition, the inner circumferential surface of the small diameter cylindrical portion 61 is tightly adhered to the outer circumferential surface of the sheath 3 due to the tightening force mentioned above, resulting in that water tightness is increased. In other words, water is prevented from entering the inside of the housing 4 through a gap between the small diameter cylindrical portion 61 and the sheath 3.

The fixing member 7 in the first embodiment is a cable clamp formed of a metal. The fixing member 7 is clamped on the holder so as to be positioned on the outer side of the sheath 3, in more detail, clamped onto the small diameter cylindrical portion 61 between the protruding wall 611 and the wall portion 63. In the first embodiment, the fixing member 7 is formed by bending a rectangular metal sheet and has, at one end, a bolt insertion hole 70 for inserting a bolt used to fix to a mounting object such as automobile body. The fixing member 7 is not shown in FIGS. 3A and 3B. The fixing member 7 may alternatively be formed of a resin material such as plastic.

An end portion of the fixing member 7 opposite to the end portion with the bolt insertion hole 70 is curved to wrap around the small diameter cylindrical portion 61 of the holder 6 and squeezes the small diameter cylindrical portion 61 against the sheath 3. As a result, the inner circumferential surface of the small diameter cylindrical portion 61 is tightly adhered to the outer circumferential surface of the sheath 3, which further increases water tightness, and in addition to this, the axial movement of the holder 6 relative to the cable 10 is further restricted.

The first sealing member 51 has a main body 511 arranged inside the inlet hole 40 of the housing 4 and a flange 512 which protrudes outward from the main body 511 and is sandwiched between the wall portion 63 of the holder 6 and an end portion of the housing 4 on the inlet hole 40 side. An opening end face 40a of the inlet hole 40 butts against the flange 512 of the first sealing member 51 and movement of the housing 4 toward the wall portion 63 is thereby restricted. Then, the movement of the housing 4 away from the wall portion 63 of the holder 6 along the longitudinal direction of the cable 10 is restricted by engagement between the engagement protrusion 45 and the engagement groove 620.

Functions and Effects of the First Embodiment

In the first embodiment of the invention, an elastic contact between the inner circumferential surface of the small diameter cylindrical portion 61 and the outer circumferential surface of the sheath 3 prevents water from entering the inside of the housing 4 through the inside of the holder 6. Particularly, in the first embodiment, the fixing member 7 clamped onto the small diameter cylindrical portion 61 of the holder 6 prevents vibration of the sheath 3 and also further increases water tightness by squeezing the holder 6 against the sheath 3.

In addition, in the first embodiment, the movement of the housing 4 in the longitudinal direction of the cable 10 is restricted by engagement between the engagement protrusion 45 of the housing 4 and the engagement groove 620 of the holder 6. This prevents water from entering the inside of the housing 4 or the inside of the sheath 3 through a gap which is formed by separation of the housing 4 from the cable 10 or misalignment of the housing 4 with the cable 10. As a result, it is possible to prevent water from entering the inside of the controller (not shown) through the inside of the sheath 3. In other words, in the first embodiment, it is possible to provide a wire harness of which water tightness does not decrease even when vibrated.

Although an example in which the first sealing member 51 is arranged in the inlet hole 40 so as to be interposed between the housing 4 and the sheath 3 has been described in the first embodiment, the first sealing member 51 may be omitted when sufficient water tightness can be provided by, e.g., an elastic contact between the large diameter cylindrical portion 62 of the holder 6 and the housing 4. In this case, it is possible to reduce the size of the wire harness 1, and in addition, the cost can be reduced since the number of components is reduced.

Second Embodiment

Figure 8:
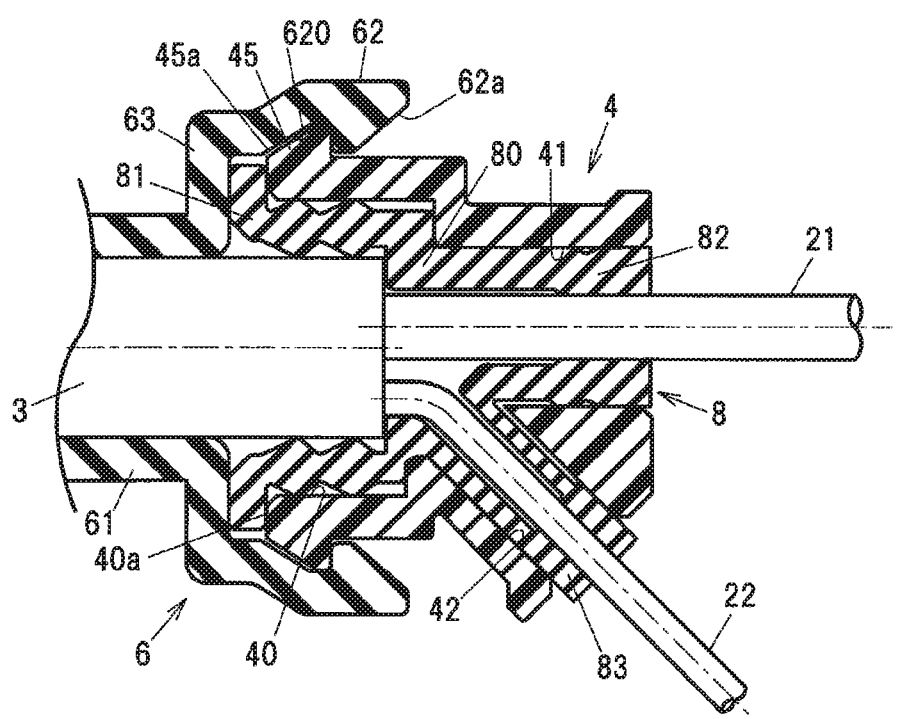
FIG. 8 is a cross sectional view showing the main portion of a wire harness in the second embodiment of the invention.

Next, the second embodiment of the invention will be described in reference to FIG. 8. FIG. 8 is a cross sectional view showing the main portion of a wire harness in the second embodiment of the invention.

While the first to third sealing members 51 to 53 are arranged in the housing 4 in the first embodiment, a single sealing member 8 as an integrated form of the first to third sealing members 51 to 53 is arranged in the housing in the second embodiment. The wire harness in the second embodiment is configured in the same manner as the first embodiment described in reference to FIG. 3, etc., except the configuration of the sealing member 8. Therefore, in FIG. 8, the same members, etc., as those described in the first embodiment are denoted by the same reference numerals as those in FIG. 3, etc., and the overlapping explanation will be omitted.

The sealing member 8 integrally has a first sealing portion 81 arranged in the inlet hole 40 of the housing 4, a second sealing portion 82 arranged in the first outlet hole 41, a third sealing portion 83 arranged in the second outlet hole 42, and a coupling portion 80 coupling the sealing portions 81 to 83 to each other. The first sealing portion 81 corresponds to the first sealing member 51 in the first embodiment, and the second sealing portion 82 and the third sealing portion 83 correspond respectively to the second sealing member 52 and the third sealing member 53 in the first embodiment.

When inserting the sealing member 8 into the housing 4, the sealing member 8 with the pair of power lines 21 and the pair of signal lines 22 preliminarily inserted thereinto is elastically deformed and is then inserted from the inlet hole 40.

The same functions and effects as the first embodiment are obtained also in the second embodiment. In addition, the cost can be further reduced since the number of components is further reduced.

SUMMARY OF THE EMBODIMENTS

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] A wire harness (1), comprising: a cable (10) that comprises electric wires (21, 22) and a sheath (3) covering the electric wires (21, 22) and is arranged so that the electric wires (21, 22) are exposed from an end of the sheath (3); a housing (4) that accommodates the end of the sheath (3) and the electric wires exposed therefrom; a sealing member (51-53 or 8) arranged inside the housing (4); and a cylindrical holder (6) comprising an elastic body and having an inner circumferential surface in contact with an outer circumferential surface of the sheath (3), wherein an engaging portion (45) provided on one of the housing (4) and the holder (6) engages an engaged portion (620) provided on an other of the housing (4) and the holder (6), and the engagement between engaging portion (45) and engaged portion (620) restricts the housing (4) from moving in a longitudinal direction of the cable (10).

[2] The wire harness (1) according to [1], wherein the sealing member (51-53) comprises wire seal members (52, 53) and a sheath seal member (51), the wire seal members (52, 53) being in elastic contact with an inner surface of the housing (4) and with the outer circumferential surfaces of the electric wires (21, 22), and the sheath seal member (51) being in elastic contact with the inner surface of the housing (4) and with the outer circumferential surface of the sheath (3).

[3] The wire harness (1) according to [2], wherein a plurality of the electric wires (21, 22) are housed in the sheath (3), the housing (4) comprises a first outlet hole (41) for some (21) of the plurality of electric wires (21, 22) to extend out and a second outlet hole (42) for the other electric wires (22) to extend out and is configured that a direction of the electric wires extending from the first outlet hole (41) is different from a direction of the electric wires extending from the second outlet hole (42), and the wire seal members (52, 53) are respectively arranged in the first outlet hole (41) and the second outlet hole (42).

[4] The wire harness (1) according to [2] or [3], wherein the wire seal members (52, 53) and the sheath seal member (51) are formed integrally.

[5] The wire harness (1) according to any one of [2] to [4], further comprising: a cable clamp (7) for fixing the cable (10) to a fixing target, wherein the cable clamp (7) is clamped on the holder (6) so as to be positioned on the outer side of the sheath (3).

[6] The wire harness (1) according to any one of [1] to [5], wherein the holder (6) has a lower hardness than the sheath (3).

[7] The wire harness (1) according to [6], wherein the holder (6) comprises an ethylene propylene rubber, and the sheath (3) comprises a thermoplastic urethane.

[8] The wire harness (1) according to any one of [1] to [7], wherein the holder (6) comprises a small diameter cylindrical portion (61) and a large diameter cylindrical portion (62), the small diameter cylindrical portion (61) having an inner circumferential surface in contact with the outer circumferential surface of the sheath (3), and the large diameter cylindrical portion (62) having a larger diameter than the small diameter cylindrical portion (61), and the engaged portion (620) is provided on the large diameter cylindrical portion (62).

[9] The wire harness (1) according to [8], wherein an engaging protrusion (45) as the engaging portion is formed on the outer surface of an end portion of the housing (4), and an annular engagement groove (620) is formed on the inner surface of the large diameter cylindrical portion (62) of the holder (6) and engages the engaging protrusion (45).

Although the embodiments of the invention have been described, the invention according to claims is not to be limited to the embodiments described above. Further, please note that all combinations of the features described in the embodiments are not necessary to solve the problem of the invention.

The invention claimed is:

1. A wire harness, comprising:
    a cable that comprises electric wires and a sheath covering the electric wires and is arranged so that the electric wires are exposed from an end of the sheath;
    a housing that accommodates the electric wires exposed from the end of the sheath;
    a sealing member arranged inside the housing; and
    a cylindrical holder comprising an elastic body and having a first inner circumferential surface in contact with an outer circumferential surface of the sheath and a second inner circumferential surface accommodating the housing and being in contact with an outer circumferential surface of the housing,
    wherein an engaging portion provided on one of the housing and the holder engages an engaged portion provided on an other of the housing and the holder, and
    wherein an engagement between the engaging portion and the engaged portion restricts the housing from moving in a longitudinal direction of the cable.

2. The wire harness according to claim 1, wherein a plurality of the electric wires are housed in the sheath, the housing comprises a first outlet hole for some of the plurality of electric wires to extend out and a second outlet hole for the other electric wires to extend out and is configured that a direction of the electric wires extending from the first outlet hole is different from a direction of the electric wires extending from the second outlet hole, and the sealing member comprises wire seal members that are respectively arranged in the first outlet hole and the second outlet hole.

3. The wire harness according to claim 1, wherein the first inner circumferential surface is in a direct contact with the outer circumferential surface of the sheath.

4. The wire harness according to claim 3, wherein the second inner circumferential surface is in a direct contact with the outer circumferential surface of the housing.

5. The wire harness according to claim 1, wherein the second inner circumferential surface is in a direct contact with the outer circumferential surface of the housing.

6. The wire harness according to claim 1, wherein the sealing member comprises wire seal members and a sheath seal member, the wire seal members being in contact with an inner surface of the housing and with outer circumferential surfaces of the electric wires.

7. The wire harness according to claim 6, wherein the sheath seal member is in contact with the inner surface of the housing and with the outer circumferential surface of the sheath.

8. The wire harness according to claim 1, wherein the sealing member comprises wire seal members and a sheath seal member, the sheath seal member being in contact with an inner surface of the housing and with the outer circumferential surface of the sheath.

9. The wire harness according to claim 1, wherein the housing comprises a first outlet hole for some of the electric wires to extend out and a second outlet hole for other electric wires to extend out.

10. The wire harness according to claim 9, wherein the housing is configured that a direction of the electric wires extending from the first outlet hole is different from a direction of the electric wires extending from the second outlet hole.

11. The wire harness according to claim 1, further comprising a cable clamp that is clamped on the holder to be positioned on the sheath.

12. The wire harness according to claim 1, wherein the holder has a different hardness from a hardness of the sheath.

13. A wire harness, comprising:
a cable that comprises electric wires and a sheath covering the electric wires and is arranged so that the electric wires are exposed from an end of the sheath;
a housing that accommodates the electric wires exposed from the end of the sheath;
a sealing member arranged inside the housing; and
a cylindrical holder comprising an elastic body and having an inner circumferential surface in contact with an outer circumferential surface of the sheath,
wherein an engaging portion provided on one of the housing and the holder engages an engaged portion provided on an other of the housing and the holder,
wherein an engagement between the engaging portion and the engaged portion restricts the housing from moving in a longitudinal direction of the cable, and
wherein the sealing member comprises wire seal members and a sheath seal member, the wire seal members being in an elastic contact with an inner surface of the housing and with outer circumferential surfaces of the electric wires, and the sheath seal member being in an elastic contact with the inner surface of the housing and with the outer circumferential surface of the sheath.

14. The wire harness according to claim 13, wherein a plurality of the electric wires are housed in the sheath, the housing comprises a first outlet hole for some of the plurality of electric wires to extend out and a second outlet hole for other electric wires to extend out and is configured that a direction of the electric wires extending from the first outlet hole is different from a direction of the electric wires extending from the second outlet hole, and the wire seal members are respectively arranged in the first outlet hole and the second outlet hole.

15. The wire harness according to claim 13, wherein the wire seal members and the sheath seal member are formed integrally.

16. A wire harness, comprising:
a cable that comprises electric wires and a sheath covering the electric wires and is arranged so that the electric wires are exposed from an end of the sheath;
a housing that accommodates the electric wires exposed from the end of the sheath;
a sealing member arranged inside the housing; and
a cylindrical holder comprising an elastic body and having a first inner circumferential surface in contact with an outer circumferential surface of the sheath;
wherein an engaging portion provided on one of the housing and the holder engages an engaged portion provided on an other of the housing and the holder,
wherein an engagement between the engaging portion and the engaged portion restricts the housing from moving in a longitudinal direction of the cable; and
a cable clamp for fixing the cable to a fixing target,
wherein the cable clamp is clamped on the holder so as to be positioned on an outer side of the sheath.

17. A wire harness, comprising:
a cable that comprises electric wires and a sheath covering the electric wires and is arranged so that the electric wires are exposed from an end of the sheath;
a housing that accommodates the electric wires exposed from the end of the sheath;
a sealing member arranged inside the housing; and
a cylindrical holder comprising an elastic body and having an inner circumferential surface in contact with an outer circumferential surface of the sheath,
wherein an engaging portion provided on one of the housing and the holder engages an engaged portion provided on an other of the housing and the holder,
wherein an engagement between the engaging portion and the engaged portion restricts the housing from moving in a longitudinal direction of the cable, and
wherein the holder has a lower hardness than the sheath.

18. The wire harness according to claim 17, wherein the holder comprises an ethylene propylene rubber, and the sheath comprises a thermoplastic urethane.

19. A wire harness, comprising:
a cable that comprises electric wires and a sheath covering the electric wires and is arranged so that the electric wires are exposed from an end of the sheath;
a housing that accommodates the electric wires exposed from the end of the sheath;
a sealing member arranged inside the housing; and
a cylindrical holder comprising an elastic body and having an inner circumferential surface in contact with an outer circumferential surface of the sheath,
wherein an engaging portion provided on one of the housing and the holder engages an engaged portion provided on an other of the housing and the holder,
wherein an engagement between the engaging portion and the engaged portion restricts the housing from moving in a longitudinal direction of the cable, and
wherein the holder comprises a small diameter cylindrical portion and a large diameter cylindrical portion, the small diameter cylindrical portion having an inner circumferential surface in contact with the outer circumferential surface of the sheath, and the large diameter cylindrical portion having a larger diameter than the small diameter cylindrical portion, and the engaged portion is provided on the large diameter cylindrical portion.

20. The wire harness according to claim 19, wherein an engaging protrusion, as the engaging portion, is formed on an outer surface of an end portion of the housing, and an annular engagement groove is formed on an inner surface of the large diameter cylindrical portion of the holder and engages the engaging protrusion.

\* \* \* \* \*